United States Patent Office

3,823,118
Patented July 9, 1974

3,823,118
PROCESS FOR PREPARING THERMOSETTABLE URETHANE RESIN
Yoshiki Matsunaga, Yokohama, Yoichi Hoshino, Tokyo, and Yoshimichi Kobayashi, Yokohama, Japan, assignors to Mitsubishi Chemical Industries, Ltd., Tokyo, Japan
No Drawing. Filed Dec. 20, 1971, Ser. No. 210,239
Claims priority, application Japan, Dec. 29, 1970, 46/120,955, 46/120,957; Apr. 20, 1971, 46/25,559
Int. Cl. C08g 22/16
U.S. Cl. 260—77.5 AQ     19 Claims

ABSTRACT OF THE DISCLOSURE

A novel thermosettable urethane resin is prepared by reacting a product (I) which is obtained by the reaction of one equivalent of a polyurethane prepolymer (A) having terminal isocyanate groups and at least two equivalents of a tertiary amine (B) having an average of at least three hydroxyl groups, with a product (II) which is obtained by the equimolar addition reaction of an organic diisocyanate (C) and a monofunctional blocking agent (D), in a proportion such that 20–80% of hydroxyl groups of the product (I) is reacted with the isocyanate groups of the product (II).

BACKGROUND OF THE INVENTION

Field of the Invention

This invention relates to a process for preparing a thermosettable urethane resin, and more particularly, this invention relates to a process for preparing a thermosettable urethane resin which can be water solubilized or emulsified by cationization. This invention also relates to a cationic thermosettable urethane resin which may be used for electrodeposition painting.

Description of the Prior Art

It has been known that urethane resins may be used for paints, coatings for metal, ink bases, fiber treatments, paper treatments, adhesives, and various other usages.

Heretofore, urethane resins which are useful for these purposes have been prepared by either "two-solution" or "single solution" techniques.

In the "two-solution" technique, a relatively low molecular weight urethane prepolymer having free isocyanate groups, and a polyol, are admixed, and the free isocyanate groups of the prepolymer are crosslinked by the hydroxyl groups of the polyl.

In the "single solution" technique, a urethane resin having free isocyanate groups, is directly applied to a metal or fiber substrate and cross-linking of the isocyanate groups is effected by reaction with the moisture in the air.

In these processes, water is reactive with the free isocyanate groups, and hence it cannot be used as a solvent for the system. Nevertheless, it would be desirable to be able to prepare curable urethane resins in an aqueous solution form, particularly for coating applications, such as in paints, or the like.

The prior art contains many references to techniques for preparing hydrophilic, e.g., water soluble or water emulsifiable, urethane resins. For instance, it is known to prepare such resins by anionizing the urethane resins by introducing anionic groups, such as carboxyl groups or sulfonic groups into the resin and then converting the group to the corresponding ammonium or amine salt. In another process, it has been suggested to introduce into the resin a basic nitrogen atom, such as a tertiary amine which is converted into the corresponding acidic salt to cationize the resin. In still another process, it has been suggested to react a polyisocyanate with a hydrophilic polyethylene glycol.

However, none of these attempts at preparing aqueous urethane resin solutions have been entirely successful, since these specialty resins have been quite difficult to cure.

The conventional hydrophilic urethane resins are generally disadvantageously characterized by a low water resistance and are too easily soluble in organic solvents.

SUMMARY OF THE INVENTION

Accordingly, it is one object of this invention to provide a novel thermosettable urethane resin.

It is another object of this invention to provide a novel cationic thermosettable urethane resin which is water soluble or emulsifiable and hence is useful for aqueous paint compositions.

It is a further object of this invention to provide a method of electrodeposition-coating using the novel cationic thermosettable urethane resin of this invention.

These and other objects, as will hereinafter be discussed, have been attained by the provision of a urethane resin having hydroxyl groups, reactive isocyanate groups, which are blocked in the structure, and tertiary nitrogen atoms, and wherein the blocked isocyanate groups can be dissociated by heat to form free isocyanate groups which are then reactable with the hydroxyl groups to cure the urethane resin.

The novel urethane resin can be prepared by reacting a product (I) which is obtained by the reaction of one equivalent of a polyurethane prepolymer (A) having terminal isocyanate groups, and at least two equivalents of a tertiary amine (B) having an average of at least three hydroxyl groups, with a product (II) which is obtained by the equimolar addition reaction of an organic diisocyanate (C) and a monofunctional blocking agent (D) in a proportion such that 20–80% of hydroxyl groups of the product (I) are reacted with the isocyanate groups of the product (II).

In the description, "1 equivalent" refers to 1 gram molecular weight divided by the number of isocyanate groups in one molecule of the compound having functional isocyanate groups, when referring to the polyurethane prepolymer, and refers to 1 gram molecular weight divided by the number of active hydrogen atoms in one molecule of the compound having active hydrogen atoms, as measured by the Zerevitinov method, when referring to the tertiary amine.

DETAILED DESCRIPTION OF THE PREFERRED EMBODIMENTS

The polyurethane prepolymer (A) having terminal isocyanate groups can be prepared by reacting more than 1 mole, preferably 1.5–2.0 moles of diisocyanate with 1 mole of diol. It is preferable to conduct said reaction in an inert solvent. The diisocyanates can be aromatic or aliphatic, such as 2,4-toluylenediisocyanate, 2,6-toluylenediisocyanate, hexamethylenediisocyanate, naphthalene-1,5-diisocyanate, methylenediphenyldiisocyanate or mixtures thereof.

Suitable diols include the glycols, such as ethylene glycol, propylene glycol, butylene glycol, diethylene glycol, neopentyl glycol; the polyethers, such as polymers or copolymers of tetrahydrofuran, ethylene oxide, propylene oxide; the polyesters prepared by conventional condensation of polyalcohol and polycarboxylic acid.

The solvents used for the reaction should be inert to the isocyanate group and are preferably such hydrophilic solvents as acetone, methyl ethyl ketone, acetonitrile, dioxane, dimethylformamide, acetate ester, or the like.

In the process of this invention, the resulting isocyanates and terminated polyurethane prepolymer is addition-reacted with at least one tertiary amine (B) having an average of at least 3 hydroxyl groups per molecule to yield product (I). It is also possible to use a mixture of one or more tertiary amines having an average of at least 3 hydroxyl groups, with one or more tertiary amines having an average of at least 2 hydroxyl groups.

The tertiary amine (B) should be used in amounts of at least 2 equivalents of tertiary amine (B) to 1 equivalent of polyurethane prepolymer (A). Where less tertiary amine is used, the polyurethane prepolymers will be bonded by the tertiary amine which will increase the molecular weight of the product (I) to form a gel. The most preferable range of the tertiary amine (B) to use, of course, will be dependent upon the types of tertiary amine (B) used and particularly the number of hydroxyl groups contained therein.

It is preferable to use a higher equivalent of tertiary amine when using tertiary amines having larger numbers of hydroxyl groups to avoid gelation of the product (I). For example, if the tertiary amine used contains 3 hydroxyl groups, e.g., triethanol amine, it is preferable to use more than 2.0 equivalents, and preferably 2.5–3.5 equivalents, and particularly about 3.0 equivalents of tertiary amine per equivalent of the polymethane prepolymer. If the tertiary amine contains 4 hydroxyl groups, it is preferable to use more than 3.0, preferably 3.5–4.5, and particularly about 4.0, equivalents. In general, for tertiary amines containing $f$ number of hydroxyl groups, it should be used in amounts of more than $f-1$, preferably $f-0.5$ to $f+0.5$ equivalents. If more than $f$ equivalents of tertiary amine are used, the excess remaining after reaction will be reacted with the isocyanate groups in the curing process.

Suitable tertiary amines (B) include triethanolamine, the adduct of 1 mole of ammonia and 3 moles of propylene oxide, the adduct of 1 mole of ammonia and 3 moles of propylene oxide, the adduct of 1 mole of ethylene diamine and 4 moles of propylene oxide, the adduct of 1 mole of diethylenetriamine and 5 moles of propylene oxide, and the adduct of 1 mole of tris(3-aminopropyl)-amine and 6 moles of propylene oxide, or the like.

The product (II) can be prepared by an addition reaction of an organic diisocyanate (C) and an equimolar amount of monofunctional blocking agent (D). The organic diisocyanate (C) is reacted with the monofunctional blocking agent (D) at the stoichiometric ratio or molar ratio of 1:1, at 40–110° C., preferably 50–80° C., usually in the presence of a solvent. The organic diisocyanate (C) may be the same diisocyanates used in the preparation of the polyurethane prepolymers (A). However, other diisocyanates can also be used for the reaction.

The monofunctional blocking agents (D) can be any conventional blocking agents used for the preparation of blocked isocyanates, such as the phenols, the lactams or the tertiary alcohols.

Suitable phenols used for this purpose include phenol or phenol substituted by alkyl, nitro, or halogen, including o-, m-, p-cresol, xylenol, p-ethylphenol, o-isopropylphenol, p-tert-butylphenol, p-tert-octylphenol, p-nitrophenol, and p-chlorophenol, etc.

Suitable lactams include butyrolactam, valerolactam, caprolactam, or the like. ε-Caprolactam is most preferable from an industrial point of view.

Suitable tertiary alcohols include t-butylalcohol, cumyl alcohol, or the like. Any inert solvent may be used for said reaction as is used for polyurethane prepolymers.

The reaction of the organic diisocyanate (C) and the monofunctional blocking agent (D) can be shown as follows:

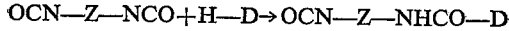

The production of byproduct

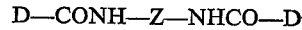

should be avoided to as large an extent as possible, since it forms water insoluble components. In order to prevent the formation of this byproduct, a large excess of diisocyanate should be used and then the excess of diisocyanate should be removed. It is laso preferable for this purpose to add the blocking agent dropwise to the diisocyanate.

The thermosettable urethane resin of this invention can be prepared by reacting the product (I) with the product (II). In the reaction, 20–80%, preferably 30–70% of the hydroxyl groups of the product (I) are reacted with the isocyanate groups of the product (II). It is especially preferable to react 50% of the hydroxyl groups of the product (I) with the isocyanate groups of the product (II), to most effectively attain thermosetting of the urethane resin.

The thermosettable urethane resin of this invention can be used as a "one solution" type urethane paint whereby the solvent solution of the urethane resin is coated onto an article and is dried to form a film. The coating is then heated to a temperature of higher than the decomposition temperature of the blocking agent to cure the urethane resin. The condition of thermosetting therefore will be dependent upon the monofunctional blocking agent (D) used. Where the blocking agent (D) is a phenol, the coated article is usually heated at temperatures of higher than 90° C. for 10–60 minutes, and where it is a lactam, the coated article is usually heated at temperatures of higher than 140° C. for 10–60 minutes. Where the blocking agent (D) is a tertiary alcohol, the coated article is usually heated at temperatures of higher than 180° C. for 10–60 minutes.

During heat curing, the urethane resin is converted into a resin having a high net structure. This resin will be characterized by excellent water resistance and will be insoluble in most organic solvents.

The blocking agent generated during the thermal-dissociation will be partially sublimed, but largely will remain in the urethane resin and will function as a plasticizer. The urethane resin of this invention can also be converted into a hydrophilic resin which is water soluble or emulsifiable, by contact with an acid to cationize the tertiary amino groups. In this instance, the urethane resin is contacted with an acid or aqueous solution of an acid, such as the organic acids including formic acid, acetic acid, propionic acid, lactic acid, citric acid, oxalic acid, or the inorganic acids, including hydrochloric acid, sulfuric acid, nitric acid, or the like.

Whether the resin is water soluble or water emulsifiable will depend largely on the ratio of the tertiary nitrogen available for cationization. Where the ratio of tertiary nitrogen is high, the resulting cationic urethane resin will be water-soluble, and if low will be emulsifiable. To obtain an emulsifiable resin, therefore, the emulsion ratio of tertiary nitrogen should be more than 0.1 percent by weight, and preferably more than 0.5 percent by weight. Where the cationic urethane resin is to be soluble, the ratio of tertiary nitrogen should be more than 1.0 percent by weight. Although a higher ratio of the tertiary nitrogen atoms will not be disadvantageous, it will be difficult to prepare a cationic urethane resin having more than 5.0 percent by weight of tertiary nitrogen.

In the process for preparing a hydrophilic cationic urethane resin according to this invention, an organic solvent is usually used. Accordingly, the resulting urethane resin will contain both water and the organic solvent.

In certain applications, the solvent mixture can be used without separating the solvent, but if desired, the organic solvent can be removed by stripping, and, if necessary, the water can be removed or the product can be concentrated.

The hydrophilic cationic thermosettable urethane resin can be used as a water base paint or can be used for electrodeposition-painting.

In electrodeposition-painting, an aqueous paint is introduced into an electrolytic vessel and the article to be painted is wired as an anode. A cathode is inserted into the paint, and an electric potential is provided between the electrodes by connecting them to a D.C. power source. The charged paint component is attracted toward the metal article by electrophoresis, and is deposited thereon. The coated metal article is removed from the bath, washed, and dried. If necessary, it may then be heated to finish painting.

Electrodeposition-painting has several distinct advantages, such as uniformity in deposition, continuity of operation, excellence of properties, thickness of the coating, and reduction in coating loss. It has the disadvantage, however, that the resin base paint used must have an electric charge in an aqueous solution in order to be susceptible to electrophoresis. It is not necessary, of course, that the entire paint components have such charge, but certainly at least the main components of resin should be charged, since the secondary components such as any amino resins, pigments, etc., will be attracted with the main resin component. Conventional resin components for electrodeposition-painting are usually water soluble resins containing carboxyl groups which carry a negative charge when used in the form of an ammonium salt or amine salt. Water soluble resins which have been used in the prior art for this purpose include the drying oils of $\alpha,\beta$-ethylenic unsaturated dibasic acid adduct (e.g., maleic oil), high acid value alkyd resins, and carboxyl-containing acrylic resins, etc. When such anionic water soluble resins are used as bases for electrodeposition-painting, however, the resin base will have a negative charge so that the metal article being painted should be used as anode. Since the same metal as is present in the article being painted is therefore serving as a solute ion in the bath, some amount of the metal ion will be incorporated into the paint film resulting in deterioration of the paint film. In one effort to alleviate this difficulty, it has been proposed to undercoat the metal with a film of zinc phosphate or iron phosphate, especially when the metal is steel, to inhibit corrosion. However, most of the metal phosphates will be dissolved into the baths used in most conventional anode electrodeposition-painting processes, so that very little corrosion inhibition can be attained.

Furthermore, during conventional anode electrodeposition-painting, water is subjected to electrolysis at the start of the operation, which can cause oxidation deterioration of the paint film.

It has now been found that these problems can be solved by using a paint containing a hydrophilic cationic thermosettable urethane resin such as that disclosed herein in a cathodic electrodeposition-painting process.

The electrodeposition-painting bath containing the hydrophilic cationic thermosettable urethane resin can be prepared by preparing an aqueous solution or emulsion of the resin and admixing suitable pigments or dyestuffs and, if necessary, a secondary resin component, e.g., amino resin, or the like. Since the electrodeposition-painting process of this invention is cathodic electrodeposition, the metal article being painted is connected to the cathode terminal.

COMPARISON OF PAINTING CONDITIONS OF THE CONVENTIONAL PROCESS AND THIS INVENTION

|  | Conventional electrodeposition painting process | This Invention |
| --- | --- | --- |
| Type of electrodeposition | Anode electrodeposition | Cathode electrodeposition |
| Voltage | 50-200 v | 50-200 v |
| Specific resistance | 200-500 Ωcm | 500-1,000 Ωcm |
| Coulometric efficiency | 5-15 mg./coulomb | 5-20 mg./coulomb |
| Equivalent | Carboxylic acid equivalent 500-1,000 | Amine equivalent 500-2,000 |

During the painting process, the temperature is usually maintained at a value of lower than 50° C., preferably 20°-40° C., and the pH of the bath is maintained at a value of lower than 7, preferably 5-6. The urethane resin film which is electrodeposited onto the metal surface in accordance with the painting process of this invention, can be cured by heating, and the suitable curing conditions and properties of the paint film will be as stated above.

Having generally described the invention, a more complete understanding can be attained by reference to certain specific examples, which are included herein for purposes of illustration only and are not intended to be limiting unless otherwise specified.

EXAMPLE 1

Into a 1 liter four-necked flask equipped with a thermometer, stirrer, funnel, drier and cooler, 87 g. (1 equivalent) of a mixture of 80% of 2,4-toluylenediisocyanate and 20% of 2,6-toluylenediisocyanate (hereinafter referred to as 80/20 TDI) was charged and was stirred at 60° C.

A solution of 100 g. (½ equivalent) of propylene glycol (molecular weight 400) in 101 g. of acetone was added dropwise through the funnel into the flask, and then the mixture was reacted at 60° C. for 3 hours. The reaction product was cooled to 40° C. and a solution of 75 g. (½ equivalent) of triethanolamine in 40 g. of acetone (hereinafter referred to as "solution A") was added dropwise and the mixture was reacted at 50°-60° C. for 2 hours.

This reaction product will be referred to as Product [I-A].

Into another four-necked flask, 87 g. (1 equivalent) of 80/20 TDI was charged and was stirred at 60° C. A solution of 56.5 g. (½ equivalent) of ε-caprolactam in 77.5 g. of acetone was added dropwise and the mixture was reacted at 60° C. for 3 hours.

The reaction product will be referred to as product [II-A].

The product [II-A] was added to the product [I-A] dropwise at room temperature, and then the mixture was reacted at 40° C. for 2 hours and then at 50° C. for 1 hour. The reaction product was added to 400 g. of a 6% aqueous solution of acetic acid, while stirring, to yield a clear aqueous solution (pH=5.2) of cationic urethane resin.

The solution was coated onto a glass plate and was dried and heated at 140° C. for 20 minutes. The urethane resin was cured and the coated film was found to have good water resistance and good solvent resistance.

EXAMPLE 2

In accordance with the process of Example 1, 87 g. (1 equivalent) of 80/20 TDI was reacted with a solution of 175 g. (½ equivalent) of polypropylene glycol (molecular weight 700) in 141 g. of acetone.

A solution of 75 g. (½ equivalent) of triethanolamine in 40 g. of acetone was then reacted with the reaction product. The product [II-A] in Example 1 was reacted to the resulting reaction product in accordance with the process of Example 1. The reaction product was added to 400 g. of a 10% aqueous solution of acetic acid to yield an aqueous solution of cationic urethane resin. The solution was coated onto a glass plate and was dried and heated at 150° C. for 20 minutes. A coated film having excellent properties similar to those of Example 1 was obtained.

EXAMPLE 3

87 g. (1 equivalent) of 80/20 TDI was reacted with a solution of 26 g. (½ equivalent) of neopentylglycol in 50 g. of acetone. The product was reacted with a solution of 75 g. (½ equivalent) of triethanolamine in 40 g. of acetone. This reaction product will be referred to as product [I-B].

Into another four-necked flask, 87 g. (1 equivalent) of 100% 2,4-toluylene diisocyanate (hereinafter referred to as 100 TDI) was charged and the mixture was stirred at 60° C. A solution of 56.5 g. (½ equivalent) of ε-caprolactam in 77.5 g. of acetone was added dropwise to said product, and the mixture was reacted at 60° C. for 3 hours. This reaction product will be referred to as product [II–B].

The product [II–B] was reacted with the product [I–B]. The resulting product was added to an aqueous solution of acetic acid to yield a thermosettable cationic urethane resin having the properties shown in Example 1.

EXAMPLE 4

In accordance with the process of Example 1, 87 g. of 80/20 TDI was reacted with a solution of 250 g. (½ equivalent) of polypropylene glycol (molecular weight 1,000) in 181 g. of acetone.

A solution of 75 g. of triethanolamine in 40 g. of acetone was reacted, and the resulting product was further reacted with the product [II–B] shown in Example 3. The reaction product was then added to an aqueous solution of acetic acid dropwise while stirring, to yield a latex. The latex was coated onto a glass plate and was dried and heated at 150° C. for 20 minutes for curing to yield a transparent coated film having high solvent resistance.

EXAMPLE 5

In accordance with the process of Example 1, 87 g. of 80/20 TDI was reacted with a solution of 100 g. (½ equivalent) of polypropylene glycol (molecular weight 400) in 100 g. of dioxane. A solution of 75 g. of triethanolamine in 40 g. of dioxane was further reacted with the product. This resulting product will be referred to as product [I–C]. 58 g. (0.67 equivalent) of 100 TDI was reacted with a solution of 38 g. (0.34 equivalent) of ε-caprolactam in 52 g. of dioxane. This resulting product will be referred to as product [II–C].

The product [I–C] was added dropwise to the product [II–C] to yield a urethane resin which is soluble in aqueous solutions of acetic acid. The solution was coated onto a glass plate and was heated at 150° C. for 30 minutes to yield a transparent film having high solvent resistance.

EXAMPLE 6

The reaction product [I–A] was produced in accordance with the process of Example 1.

Into another four-necked flask, 87 g. (1 equivalent) of 100 TDI was charged and was stirred at 60° C.

A solution of 47 g. of phenol (½ equivalent) in 72 g. of acetone was added dropwise at 60° C. for 3 hours. After the addition, the mixture was reacted at 60° C. for 1 hour. This reaction product will be referred to as product [II–D]. The product [II–D] was added dropwise to the product [I–A], and then was reacted at 40° C. for 2 hours, and at 50° C. for 1 hour. The reaction product was admixed with 37 g. of acetic acid while stirring.

400 g. of water was added dropwise to yield a transparent aqueous solution of cationic urethane resin, pH=4.53. The solution was coated onto a glass plate and was dried at 110° C. for 30 minutes, and then was heated at 130° C. for 10 minutes.

The urethane resin was easily cured and a coated film having excellent water resistance and solvent resistance, was obtained.

EXAMPLE 7

In accordance with the process of Example 1, 87 g. (1 equivalent) of 80/20 TDI was reacted with a solution of 33.5 g. (½ equivalent) of dipropylene glycol in 65.5 of acetone, and then was further reacted with a solution of 75 g. of triethanolamine in 40 g. of acetone.

The reaction product was further reacted with the product [II–D] in accordance with the process of Example 6. The product was soluble in 300 g. of 10% aqueous solution of acetic acid.

The resulting cationic urethane was coated onto a glass plate and was heated at 110° C. for 30 minutes to yield a coated film having similar properties to the product of Example 6.

EXAMPLE 8

The product [I–B] of Example 3 was reacted with the product [II–D] of Example 6. The resulting product was added to an aqueous solution of acetic acid to yield a clear aqueous solution of cationic urethane resin. The solution was coated onto a glass plate and was dried and heated at 120° C. for 20 minutes for curing.

EXAMPLE 9

The product [I–A] was produced in accordance with the process of Example 1.

Into another four-necked flask, 87 g. (1 equivalent) of 100 TDI was charged and was stirred at 60° C. A solution of 69.5 g. (½ equivalent) of p-nitrophenol in 85 g. of dioxane was reacted with the product at 60° C. for 1 hour. This reaction product will be referred to as product [II–E].

The product [I–A] was reacted with the product [II–E] in accordance with the process of Example 6.

The resulting product was added to an aqueous solution of acetic acid to yield a clear aqueous solution of cationic urethane resin. The solution was coated onto a glass plate and was dried and heated at 140° C. for 30 minutes to effect curing.

EXAMPLE 10

The reaction of Example 9 was repeated except using 64.3 g. (½ equivalent) of p-chlorophenol, instead of p-nitrophenol. An aqueous solution of cationic urethane resin was obtained. The solution was coated onto a glass plate and was dried and heated at 120° C. for 30 minutes to effect curing.

EXAMPLE 11

The reaction of Example 9 was repeated except using 54 g. (½ equivalent) of p-cresol instead of p-nitrophenol. An aqueous solution of cationic urethane resin was obtained. The solution was coated onto a glass plate and was dried and heated at 160° C. for 30 minutes to effect curing.

EXAMPLE 12

The process for preparing the product [I–A] in Example 1 was repeated, except a solution of 61.1 g. (1.25 equivalent) of triethanolamine in 33.4 g. of acetone was used instead of solution A, and the product [I–D] was prepared.

Into another four-necked flask, 65.3 g. (0.75 equivalent) of 80/20 TDI was charged and was stirred at 60° C. A solution of 35.2 g. (0.375 equivalent) of phenol in 54.5 g. of acetone was added dropwise and then the mixture was reacted for 1 hour. This reaction product will be referred to as product [II–F]. The product [II–F] was added dropwise to the product [I–D] over 2 hours at room temperature, and then was reacted at 40° C. for 2 hours, and at 50° C. for 1 hour. The reaction product was added, while stirring, to 350 g. of 6% aqueous solution of acetic acid, to yield a clear aqueous solution of cationic urethane resin having a pH of 5.3.

This solution was coated onto a glass plate and was dried and heated at 110° C. for 20 minutes, whereby the urethane resin was cured. A coated film having excellent water resistance and solvent resistance was obtained.

EXAMPLE 13

The process for preparing the product [I–A] in Example 1 was repeated, except a solution of 49.7 g. (1 equivalent) of triethanolamine in 26.8 g. of acetone was used instead of solution A. Product [I–E] was prepared. The product [II–G] was prepared in accordance with the process for preparing the product [II–F] in Example 12, except that a solution of 43.5 g. (0.5 equivalent) of 80/20 TDI and 23.5 g. of phenol in 36 g. of acetone was used. The product [II–G] was reacted with the product [I–E] in accordance with the process of Example 12.

The resulting product was dissolved in an aqueous solution of acetic acid and the resulting hydrophilic cationic urethane resin was cured at 110° C. for 20 minutes.

EXAMPLE 14

87 g. (1 equivalent) of 80/20 TDI was reacted with a solution of 26 g. (½ equivalent) of neopentylglycol in 61 g. of acetone, and then a solution of 49.7 g. (1 equivalent) of triethanolamine in 26.8 g. of acetone was reacted therewith. This reaction product will be referred to as product [I–F]. The product [II–H] was prepared in accordance with the process of Example 12 (product [II–F]), except a solution of 43.5 g. (0.5 equivalent) of 100 TDI and a solution of 28.3 (0.25 equivalent of e-caprolactam in 38.2 g. of acetone was used. The product [II–H] was reacted with the product [I–F] in accordance with the process of Example 12. The resulting product was dissolved in an aqueous solution of acetic acid. The resulting hydrophilic cationic urethane resin was cured at 110° C. for 20 minutes.

EXAMPLE 15

The process for preparing product [I–A] in Example 1 was repeated, except a solution of 146 g. (2 equivalent) of Adekaquadrol (manufactured by Asahidenka Kabushiki Kaisha; adduct of 4 moles of propylene oxide and 1 mole of ethylenediamine) in 79 g. of acetone, was used instead of solution A. Product [I–G] was prepared.

Into another four-necked flask, 87 g. (1 equivalent) of 100 TDI and was stirred at 60° C. A solution of 47 g. (½ equivalent) of phenol in 72 g. of acetone was added dropwise for 2 hours and was further reacted for 1 hour. This reaction product will be referred to as product [II–J].

An aqueous solution of cationic urethane resin (pH =5.5) was obtained by reacting the product [I–G] with the product [II–J]. This solution was coated onto a glass plate and was dried and heated at 120° C. for 20 minutes to effect curing. A coated film having excellent water resistance and excellent solvent resistance was obtained.

EXAMPLE 16

The process for preparing the product [I–A] in Example 1 was repeated, except a solution of 109.5 g. (⅗ equivalent) of Adekaquadrol in 59.5 g. of acetone was used instead of solution A. The product [I–H] was prepared.

The process for preparing product [II–J] in Example 15 was repeated, except 87 g. (1 equivalent) of 80/20 TDI was used instead of 100 TDI. The product [II–K] was prepared. An aqueous solution of cationic urethane resin was obtained by reacting product [I–H] with product [II–K]. The resin was cured by heating at 120° C. for 20 minutes.

EXAMPLE 17

The product [I–A] was prepared in accordance with the process of Example 1.

Into another four-necked flask, 87 g. (1 equivalent) of 100 TDI was charged and was stirred at 60° C. A solution of 37 g. (½ equivalent) of t-butanol in 67 g. of acetone was added dropwise and then reacted at 60° C. for 3 hours. This reaction product was referred to as product [II–L].

An aqueous solution of cationic urethane resin was obtained by reacting product [I–A] with product [II–L]. This solution was coated onto a glass plate and was dried and heated at 180° C. for 30 minutes to effect curing. The coated film had excellent water resistance and excellent solvent resistance.

EXAMPLE 18

The cationic urethane resin of Example 1 was diluted with a mixture of water (97%)-ethylene glycol monomethyl ether acetate (3%) in 10% of solid concentration, as an electrodeposition-painting bath. The electrodeposition-painting was conducted at 30° C. at a pH of 5.8 for 1 minute while stirring, whereby the cationic urethane resin was deposited onto the cathode plate. The cathode plate was removed from the bath and was washed with water, and heated at 140° C. for 20 minutes.

A coated film having a high luster and excellent water and solvent resistance was obtained.

The following results were found from the increase of weight of the cathode plate and quantity of electricity:

|  | Coulometric efficiency (mg./coulomb) | Specific resistance (Ωcm.) | Specific chemical equivalent (as amine) |
| --- | --- | --- | --- |
| Voltage: |  |  |  |
| 100 v | 6.95 | 695 | 671 |
| 200 v | 13.3 | 590 | 570 |

EXAMPLE 19

The cationic urethane resin of Example 2 was diluted with water to a solid concentration of 5%–10% and was used as an electrodeposition-painting bath. Electrodeposition-painting was conducted at 30° C. at a pH of 5.9, a voltage of 100 v., for 1 minute, in accordance with the process of Example 18.

The following results were obtained:

|  | Coulometric efficiency (mg./coulomb) | Solution specific resistance (Ωcm.) | Specific chemical equivalent (as amine) |
| --- | --- | --- | --- |
| Solid component (percent): |  |  |  |
| 5 | 12.4 | 520 | 1,200 |
| 10 | 6.7 | 675 | 647 |

The properties of the coated film were as follows:

Tensile hardness _____ 4H.
Cross-cut test _____ 100/100.
Erichsen value _____ 7.0<.
Impact strength _____ 50 cm./kg.
Flexibility _____ Good.

The coated film was stable in acetone, benzene, ethyl acetate, or dimethylformamide.

EXAMPLE 20

The cationic urethane resin of Example 3 was diluted with water to a solid concentration of 10% as an electrodeposition-painting bath. The electrodeposition-painting was conducted at 20° C., 30° C. or 45° C. of the bath temperature, in accordance with the process of Example 18.

The results were as follows:

|  | Coulometric efficiency (mg./coulomb) | Solution specific resistance (Ωcm.) | Specific chemical equivalent (as amine) |
| --- | --- | --- | --- |
| Bath temperature (° C.): |  |  |  |
| 20 | 7.35 | 666 | 710 |
| 30 | 6.95 | 675 | 670 |
| 45 | 20.2 | 445 | 1,950 |

Having now fully described the invention, it will be apparent to one of ordinary skill in the art that many changes and modifications can be made thereto without departing from the spirit or scope of the invention. Accordingly, what is claimed as new and desired to be secured by Letters Patent is:

1. A process for preparing a thermosettable urethane resin which comprises reacting a product (I) which is obtained by the reaction of one equivalent of a polyurethane prepolymer (A) having terminal isocyanate groups and prepared by reacting an excess of an aliphatic or aromatic diisocyanate with a diol, and at least two equivalents of a tertiary amine (B) having an average of at least three hydroxyl groups, with a product (II) which is obtained by the equimolar addition reaction of an organic diisocyanate (C) and a monofunctional blocking agent (D), in a proportion such that 20–80% of hydroxyl groups of the product (I) is reacted with the free isocyanate groups of the product (II).

2. The process according to Claim 1, wherein the tertiary amine (B) contains from 3 to 6 hydroxyl groups.

3. The process according to Claim 1, wherein the tertiary amine (B) is triethanolamine.

4. The process according to Claim 1, wherein the monofunctional blocking agent (D) is a phenol.

5. The process according to Claim 1, wherein the monofunctional blocking agent is a lactam.

6. The process according to Claim 1, wherein the monofunctional blocking agent (D) is a tertiary alcohol.

7. A thermosettable urethane resin prepared by the process according to Claim 1.

8. A process for preparing a hydrophilic cationic thermosettable urethane resin which comprises reacting a product (I) which is obtained by the reaction of one equivalent of a polyurethane prepolymer (A) having terminal isocyanate groups and prepared by reacting an excess of an aliphatic or aromatic diisocyanate with a diol, and at least two equivalents of a tertiary amine (B) having an average of at least three hydroxyl groups with a product (II) which is obtained by the equimolar addition reaction of an organic diisocyanate (C) and a monofunctional blocking agent (D), in a proportion such that 20–80% of hydroxyl groups of the product (I) is reacted with the free isocyanate groups of the product (II), to yield a product (III), and then contacting the product (III) with an acid (E) to cationize the tertiary amine groups of the product (III).

9. The process according to Claim 8, wherein the tertiary amine (B) contains from 3 to 6 hydroxyl groups.

10. The process according to Claim 8, wherein the tertiary amine (B) is triethanolamine.

11. The process according to Claim 8, wherein the monofunctional blocking agent (D) is a phenol.

12. The process according to Claim 8, wherein the monofunctional blocking agent (D) is a lactam.

13. The process according to Claim 8, wherein the monofunctional blocking agent (D) is a tertiary alcohol.

14. The process according to Claim 8, wherein the acid (E) is acetic acid.

15. A hydrophilic cationic thermosettable resin prepared by the process according to Claim 8.

16. A process according to Claim 8, wherein about 3 equivalents of a tertiary amine (B) having 3 hydroxyl groups, is used.

17. The process according to Claim 16, wherein the tertiary amine (B) is triethanolamine.

18. The process according to Claim 8, wherein about 4 equivalents of tertiary amine (B) having 4 hydroxyl groups, is used.

19. The process according to Claim 18, wherein the tertiary amine (B) is an adduct of 4 moles of propylene oxide and 1 mole of ethylene diamine.

References Cited

UNITED STATES PATENTS

| | | | |
|---|---|---|---|
| 3,248,371 | 4/1966 | Damusis | 260—77.5 AQ |
| 3,342,780 | 9/1967 | Meyer et al. | 260—77.5 NC |
| 3,493,525 | 2/1970 | Britain | 260—77.5 AQ |
| 3,574,167 | 4/1971 | Case et al. | 260—77.5 AQ |
| 3,580,873 | 5/1971 | Bianca | 260—77.5 AQ |
| 3,583,943 | 6/1971 | Weber et al. | 260—77.5 TB |
| 3,655,588 | 4/1972 | Mosso et al. | 260—77.5 AQ |
| 3,655,814 | 4/1972 | Rembaum | 260—77.5 AQ |
| 3,723,372 | 3/1973 | Wakimoto et al. | 260—77.5 TB |
| 3,679,564 | 7/1972 | Dowbenks et al. | 204—181 |

MAURICE J. WELSH, Primary Examiner

U.S. Cl. X.R.

260—77.5 TB, 77.5 Q